United States Patent [19]

Mugglestone

[11] 4,392,278
[45] Jul. 12, 1983

[54] FASTENER
[75] Inventor: Peter R. Mugglestone, Ormond, Australia
[73] Assignee: Illinois Tool Works Inc., Chicago, Ill.
[21] Appl. No.: 239,224
[22] Filed: Feb. 27, 1981
[30] Foreign Application Priority Data
Feb. 20, 1980 [AU] Australia ............... PE2462
[51] Int. Cl.³ ............................................. A44B 17/00
[52] U.S. Cl. ................................................. 24/213 R
[58] Field of Search .................. 24/214; 411/510, 509, 411/508

[56] References Cited
U.S. PATENT DOCUMENTS
2,909,957  10/1959  Rapata .............................. 24/213 R FOREIGN PATENT DOCUMENTS
2446143  4/1975  Fed. Rep. of Germany ...... 411/510

Primary Examiner—Robert Peshock
Attorney, Agent, or Firm—Jerold M. Forsberg; Thomas W. Buckman; Jack R. Halvorsen

[57] ABSTRACT

This invention relates to a one-piece push-in type of fastener having side wings or fronds on a shank and adapted to prevent withdrawal of the fastener when inserted into a hole in which the shank is of H-shape in cross-section with wings or fronds on opposite plane surfaces of the shank and with the front surface of each wing or frond curved at its inner end to lead to the inner end of the rear surface of the next adjacent wing or frond.

8 Claims, 5 Drawing Figures

FASTENER

This invention relates to an improved fastener and it refers particularly to a push-in type of fastener which does not require a screw-threaded fitting, as a nut, to retain it in position. Furthermore the invention is directed to that push-in type of fastener shown in U.S. Pat. No. 3,810,279 which discloses a fastener having a shank of generally cruciform section to provide a multiplicity of flat, axially extending surfaces having a plurality of axially spaced resilient wings or fronds thereon adapted, upon insertion of the fastener shank into a hole, to bend rearwardly and to resist withdrawal of the fastener from the hole. Fasteners of this type are particularly useful for retaining in assembled relationship two panels, such as a plastics interior trim panel to the body of an automobile.

It is known that close tolerances cannot be maintained easily in the construction of such trim panels and, indeed, they may be designed to be of different thicknesses at different locations for purposes of structural strength or otherwise. Accordingly, to fasten them in position it is necessary to have either a range of fasteners of different lengths, which makes inventory for assembly difficult, or to have fasteners which are effective with panels of different thicknesses. Thus, it is an object of the invention to provide a fastener which will accommodate a large range of panel thicknesses.

It is also desirable for the fastener to apply a retaining pressure which will tend to eliminate rattles.

Another object is to provide a fastener which will locate centrally in the holes into which it is fitted.

A further object is to provide a fastener which may be easily inserted into aligned holes of two or more panels so as to hold the panels together, which may be removed and re-used without loss of effectiveness, which will apply a resilient pressure to the assembled parts so as to reduce likelihood of rattling, and which may be readily made by mass production methods.

According to the invention there is provided a fastener having a relatively rigid shank adapted to fit centrally in a hole or pair of aligned holes and two longitudinally arranged rows of wings or fronds on the shank in opposed relationship, the wings or fronds being resilient and adapted to engage the inner wall of said hole or holes to resist withdrawal of the fastener therefrom, and a head at one end of the shank.

In order that the invention may be more readily understood reference will now be made to the accompanying drawings illustrating a fastener made in accordance with the invention. In these drawings.

Figure 1:
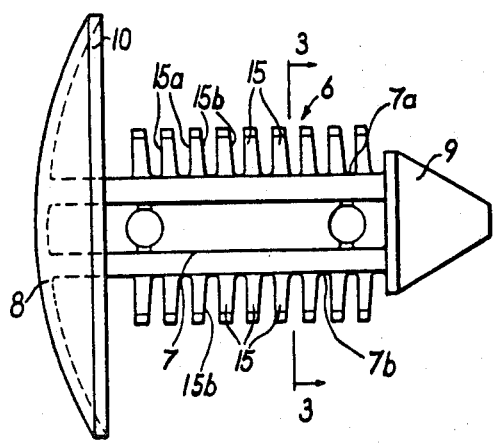
FIG. 1 is a side elevation of the fastener.
Figure 2:
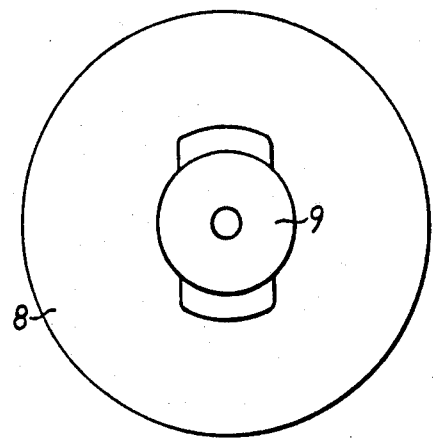
FIG. 2 is an end view as seen from the right hand side of FIG. 1.

As illustrated the fastener (6) has a shank (7) with a head (8) at one end and a tapered nose portion (9) at the other end. The head (8) in this embodiment, is of convex or domed shape—concave on the underside—so that its rim (10) is adapted to press on a panel (11) into which the shank (7) is inserted. As the material—a thermoplastic such as a polyamide—is resilient the fastener may be applied in such manner that the head will exert a resilient sealing pressure on said panel. The tapered nose portion (9) will assist in locating the shank (7) centrally in the hole (12) in the panel (11) and aligned hole (13) in a second panel (14).

The shank (7) is made of somewhat H-shape in cross-section so as to fit neatly within a circumscribed circle of the same diameter as the holes (12) and (13) into which the fastener is to be fitted. Thus, when the fastener is so engaged at a plurality of points on the hole diameter, the central longitudinal axis of the shank will lie on the central axis of those holes and hold the fastener in that central position. Additionally, this spaces the planar surfaces (7a) and (7b) a predetermined distance from the opposing diametral edges of the hole with which the fastener is associated.

On each of the two opposite plane faces (7a) and (7b) of the H-shaped shank (7) are a number of wings or fronds (15), and the wings or fronds on one side are directly opposite those on the other side. Each of said wings or fronds has a rear surface (15a) (facing the head) which is substantially at right angles to the longitudinal axis of the shank and a front surface (15b) which is inclined outwardly and rearwardly relative to the shank. That is to say, the outer end of each frond is thinner than its base. The front surface (15b) of each frond which faces away from head (10) (other than the two closest to the tapered nose portion) is curved at its inner end and leads to the inner end of the rear surface (15a) facing head (10) of the next adjacent frond.

Figure 4:
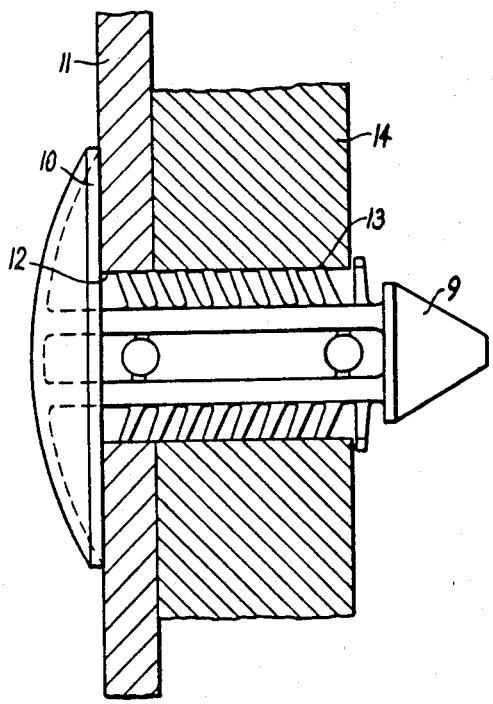
FIG. 4 is a detail view in partial section of the fastener in operative position securing two panels of different thicknesses together and, FIG. 5 is an enlarged detail view in section of the wings or fronds of the fastener.
Figure 3:
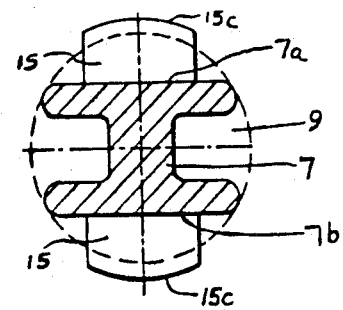
FIG. 3 is a section on line 3—3 of FIG. 1.
Figure 5:
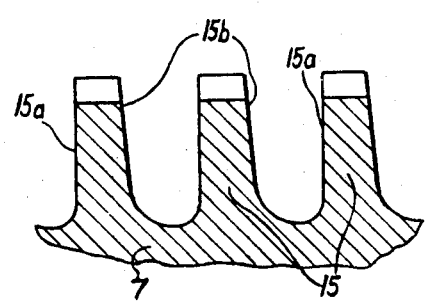

Each frond (15) is of a radial length greater than said circumscribed circle and the outer end (15a) of each frond may be, if desired, arcuate in shape, the center of curvature being the longitudinal axis of the shank. Thus, when the fastener is inserted in the aligned holes (12) and (13) in a pair of panels (11) and (14) the fronds (15), as shown in FIG. 4, will be caused to bend rearwardly, to an extent depending upon the lengths of the fronds, until they can slide into said holes and then, being rearwardly-deflected, will resist the withdrawal of the fastener from the holes or either of them. It is believed that a suitable radial length for the fronds is about ⅓ greater than the distance from the adjacent side, (7a) or (7b), of the shank to the circumscribing circle on the radial line normal to said side through said longitudinal axis. The side edges of said fronds may well be parallel, while the roots or line of connection with the faces (7a) and (7b) are a straight line to give minimum stress during bending of fronds (15).

If desired, the fronds on one side of the stem may be axially staggered in relation to the fronds on the other side instead of being directly opposite them. Also, there may be any suitable number—such as nine—of said fronds on each side of the shank. The number of fronds will depend partly on the length of the shank outwardly from the perimeter of the head—it is believed there is no necessity to form fronds on that part of the shank which extends within the concave inner part of the head. The front frond or pair of fronds may close to the rear end of the tapered nose portion.

By varying the geometry of the fronds—such as their thickness in relation to their radial length—the relative resilience of the fronds may be varied. The proportions shown in the attached drawings is approximately 1:3 but may be increased or decreased according to the degree of "grip" required. The "grip" of the fastener may also be varied by selection of different plastics materials for the manufacture of the fastener. The positive central locating feature provided by the H-shaped rigid shank insures that the pressures exerted against the oppositely exending fronds (15) are equalized and positive uniform gripping is insured.

It is believed the fastener provided by this invention has certain features, which may be considered individually and/or in combination, as follows: The relatively rigid shank is constructed to provide for central location in the holes; the rows of fronds will accommodate a large range of panel thicknesses from thin sheet material apertures to deep bores; the insertion and removal forces may be changed by relatively simple changes in geometry of the fronds; the fastener may be used a number of times without any real loss of effectiveness; a resiliency of connection between the panels which should reduce rattling; convenience in manufacture, such as by two plate molding, due to the wings or fronds being on only two sides of the shank; and the choice of head styles can be adapted for a multitude of applications.

I claim:

1. A reusable fastener of the one-piece push-in type having a longitudinal axis and laterally extending fronds on a shank to inhibit withdrawal of the fastener shank when inserted into a preformed hole, said fastener shank being generally H-shape in cross-section with opposite side faces and adapted to fit neatly within a hole into which the fastener is to be fitted, a plurality of axially spaced fronds on each said opposite side face of the shank to form two rows of fronds in opposed relationship, said fronds being resilient and adapted to engage the inner wall of said hole to resist withdrawal of the fastener therefrom, a head at one end of the shank, whereby when said fastener is positioned in said hole said H-shape shank centrally locates said longitudinal axis of said fastener relative to the central axis of said hole thereby insuring engagement of both rows of fronds with said inner wall of said hole.

2. A fastener, as defined in claim 1, wherein said head is domed shaped and has a lateral extent greater than the lateral extent of said fronds.

3. A fastener, as defined in claim 1, wherein said shank having laterally extending fronds thereon has a greater lateral extent than the hole.

4. A fastener, as defined in claim 1, having a tapered nose at the end of the shank opposite said head.

5. A reusable fastener of the one-piece push-in type having a longitudinal axis and laterally extending fronds on a shank to inhibit withdrawal of the fastener shank when inserted into a preformed hole, said fastener shank formed with two faces on opposite sides thereof and adapted to fit neatly within a hole into which the fastener is to be fitted, a plurality of axially spaced fronds on each said face, a head at one end of the shank, each frond having a rear surface facing said head substantially normal to the longitudinal axis of the shank and a front surface inclined relative to the shank, the front surface of each frond curved at its inner end to lead to the inner end of the rear surface of the next adjacent frond said fronds being resilient and adapted to engage the inner wall of said hole to resist withdrawal of the fastener therefrom, whereby when said fastener is positioned in said hole said shank centrally locates said longitudinal axis of said fastener relative to the central axis of said hole thereby insuring engagement of fronds on both faces with said inner wall of said hole.

6. A fastener, as defined in claim 5, wherein said head is dome shaped and has a lateral extent greater than the lateral extent of said fronds.

7. A fastener, as defined in claim 5, wherein said shank having laterally extending fronds thereon has a greater lateral extent than the hole.

8. A fastener, as defined in claim 5, having a tapered nose at the end of the shank opposite said head.

* * * * *